United States Patent [19]

Zeth

[11] Patent Number: 4,758,851
[45] Date of Patent: Jul. 19, 1988

[54] METHOD FOR THE DETERMINATION AND INDICATION OF THE SUPPLY OF FILM IN AERIAL PHOTOGRAPHY CAMERAS

[75] Inventor: Ulrich Zeth, Jena, German Democratic Rep.

[73] Assignee: Jenoptik Jena G.m.b.H, Jena, German Democratic Rep.

[21] Appl. No.: 927,761

[22] Filed: Nov. 6, 1986

[30] Foreign Application Priority Data

Dec. 23, 1985 [DD] German Democratic Rep. ................................. 2851451

[51] Int. Cl.⁴ .......................... G03B 1/64; G03B 39/04
[52] U.S. Cl. ........................................ 354/72; 354/65; 354/218
[58] Field of Search ................... 354/65, 72, 217, 218

[56] References Cited
U.S. PATENT DOCUMENTS 3,816,842  6/1974  Glaros et al. .................. 354/218 X Primary Examiner—Michael L. Gellner
Attorney, Agent, or Firm—Jordan and Hamburg

[57] ABSTRACT

A method is provided for determining and indicating a supply of film remaining in an aerial photography camera, which results in greater measuring precision and improved indication options. While film is advanced during a film step from a film feed spool through a film advancing device to a film take-up spool, pulse counts are taken by coded discs connected to each of the film feed spool and film advancing device. These pulse counts and the length of film advanced during the film step are then used to determine the total circumference of the film on the film feed spool. The total circumference and film thickness are then used to determine the number of film windings remaining on the film feed spool. Finally, the number of remaining exposures of film and the remaining length of the film are determined from the number of remaining windings and both are indicated at an indicator unit.

9 Claims, 2 Drawing Sheets

METHOD FOR THE DETERMINATION AND INDICATION OF THE SUPPLY OF FILM IN AERIAL PHOTOGRAPHY CAMERAS

The invention relates to a method for the determination and indication of the supply of film in aerial photography cameras, whereby the film advancing device of the film magazine is provided with a coded disc for the determination of the length 1 of film which is advanced per film step and the feed spool is provided with a coded disc for the control of the advancement of the film which has taken place.

BACKGROUND OF THE INVENTION

In aerial photography cameras, the length of the film is generally determined as a function of the thickness of the film and the radius or diameter of the roll of film. As auxialiary means for this purpose there are known dial gauges which are generally arranged in the cover of the film magazine and are connected to an indicator unit. The indication is subdivided either in meters of the supply of film or in numbers of exposures.

Various film thicknesses are taken into consideration by order of magnitude by various scales on the dial gauges.

Disadvantages are the low indication precision which results because the actual thickness of the film is insufficiently taken into account and because of the limited precision of the lever transmission. Read-out is not possible at a central operating unit, but only on the film magazine itself.

In magnetic tape technology (DE-OS No. 2918544) it is known to determine the remaining length of a tape from the determination of the rotation periods of a take-up spool and a feed spool. In order to determine the necessary starting data in these systems, however, there is required a measuring run with subsequent rewinding of the tape. Such a measuring run with subsequent rewinding is not possible in the film magazine of an aerial photography camera, which is provided with a drive operating in only one direction.

SUMMARY OF THE INVENTION

An object of the invention is to provide a method for the determination of a supply of film characterized by a higher measuring precision and better indication options for an operator than exist in piror art methods.

Another object of the invention is to provide a method for the determination and indiction of a supply of film allowing an exact indication of the existing film supply to a central operating unit while taking into consideration the technical requirements for the construction of a conventional film magazine.

In accordance with the invention, the above objects are achieved by a method for determining and indicating a remaining supply of film on a film feed spool in an aerial photography camera comprising advancing film in a film step from a film feed spool through a film advancing device to a film take-up spool; counting first pulses representing a length of film advanced during the film step with a first coded disc connected to the film advancing device; counting second pulses representing a length of film on a circumference of the supply of film over an angle $\alpha$ during the film step with a second coded disc connected to the film feed spool, wherein $\alpha$ is the degree of rotation of the film feed spool during the film step; determining a total circumference of film on the film feed spool based on the first pulses, second pulses and length of film advanced during the film step; determining a number of windings of film remaining on the film feed spool based on the total film circumference and a thickness of the film; determining a number of remaining exposures of film and a remaining length of film based on the number of remaining windings of film; and indicating the number of remaining exposures of film and remaining length of film on an indicating unit.

BRIEF DESCRIPTION OF THE DRAWING

In order that the invention may be more clearly understood, it will now be disclosed in greater detail with reference to the accompanying drawings, wherein.

DETAILED DESCRIPTION OF THE PREFERRED EMBODIMENTS

Figure 1:
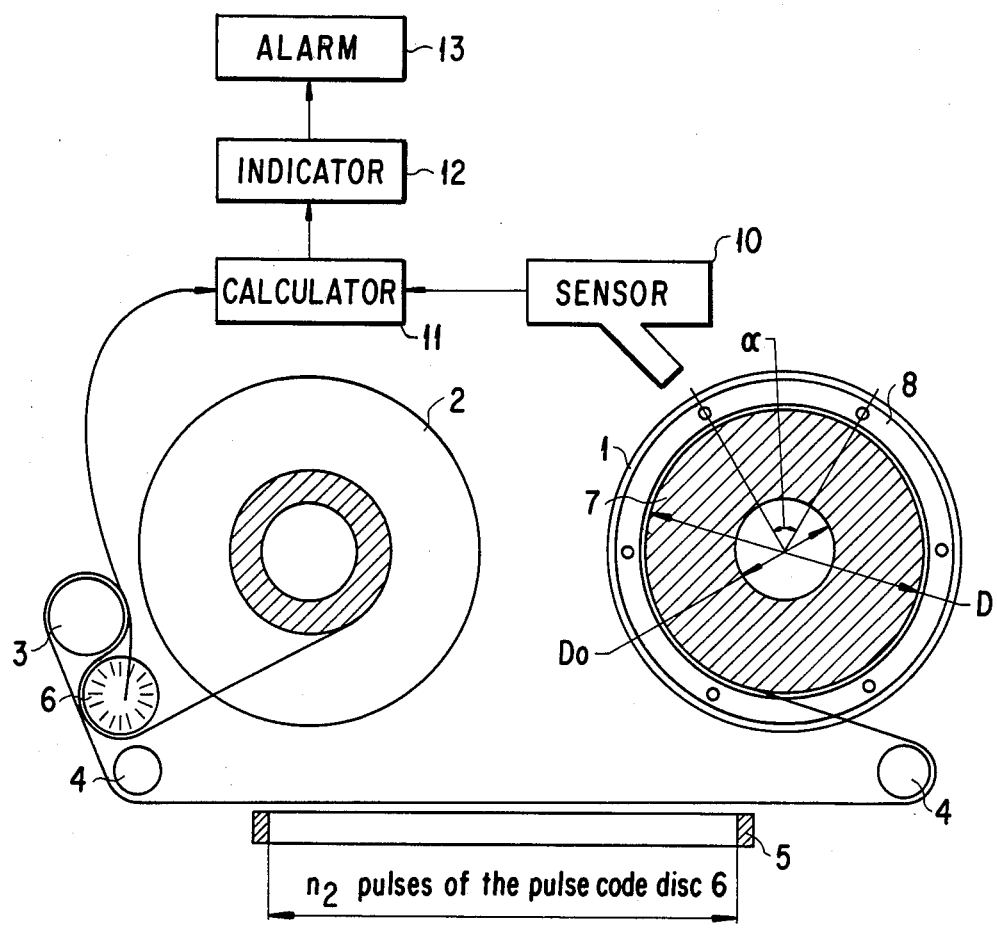
FIG. 1 illustrates schematically an embodiment of an apparatus that can be used in the method of the invention.

As shown in FIG. 1, the film magazine of an aerial photography camera is provided with a film feed spool 1 and a film take-up spool 2, as well as a film advancing device 3 with respective turn-around rolls 4 for guidance of the film during advancing. After exposing the section of film laying over a focal-plane frame 5 for the film, the film is advanced by a respective film step.

The measuring principle according to the invention for the determination of the remaining supply of film on the feed roll 1 of the film consists in that a specified length 1 of film is unwound per film step from a film roll 7 containing the supply of film and the film roll 7 is thereby rotated by a specified angle. The magnitude of this angle of rotation depends on the particular circumference of the film roll 7, which is related to the length of film which still remains on the particular film roll 7. The measurement itself is that, during the execution of the film step, by means of a coded measuring roller or disc 6 which is connected to the film advancing device 3, there are counted a specified number $n_2$ of pulses assigned to the film step length. Furthermore, the film spool 1 is connected to a coded disc 8 on which holes or slots are spaced over its circumference by an angle $\alpha$, which holes or slots are scanned by a sensor 10. While the film is advancing, a number $n_3$ of film step pulses are counted by means of the coded measuring roller 6 which lie within the range of two counting pulses of the coded disc 8. They are the measurement of the length of the section of film on the portion of the circumference of the film roll 7, which is determined by the angle $\alpha$. The respective total circumference $U_{n1}$ ($n_1$ = number of the remaining turns of film) is calculated as follows:

$$U_{n1} = \frac{360° \cdot n_3}{\alpha° \cdot n_2} \cdot 1 \tag{1}$$

Figure 2:
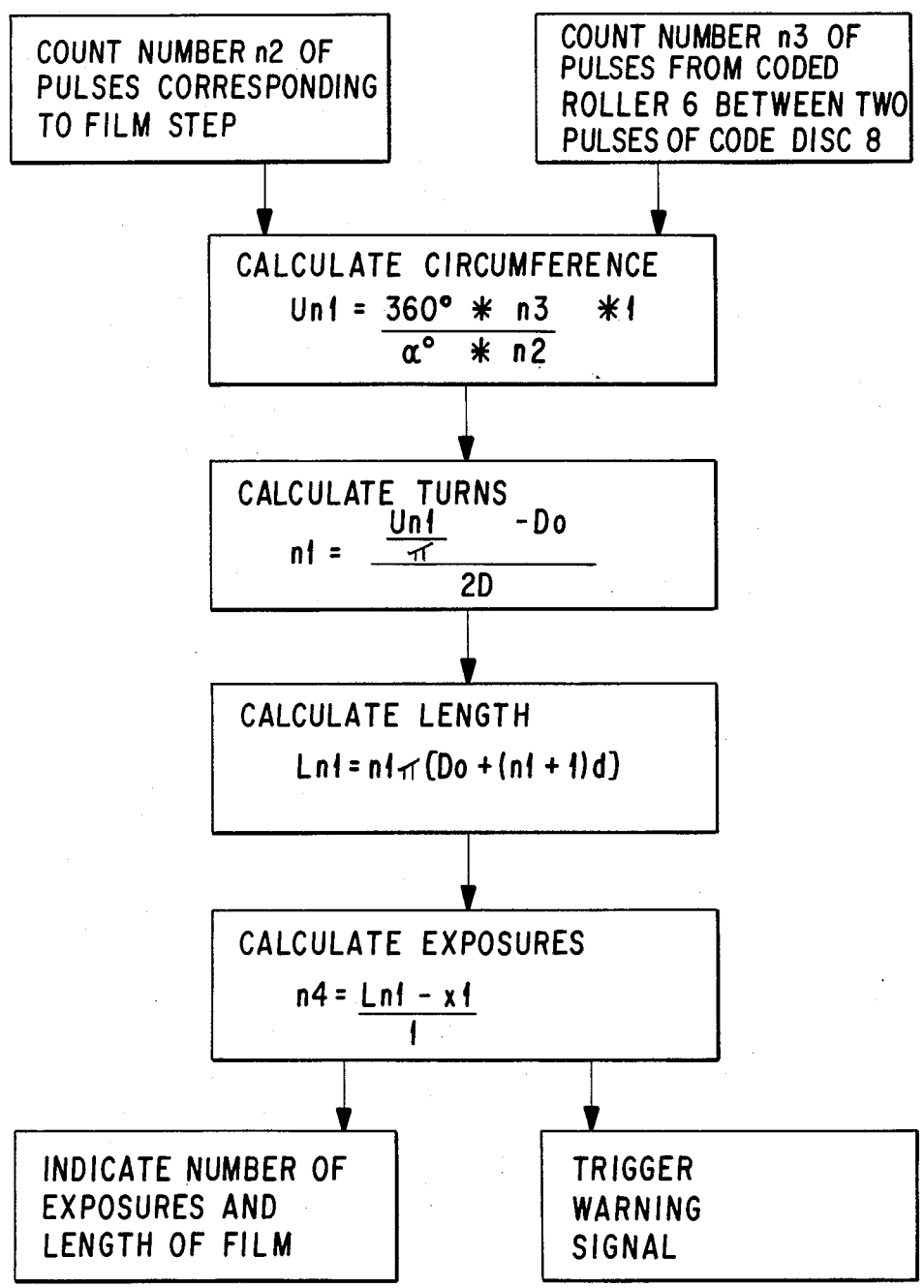
FIG. 2 is a flow diagram illustrating the method of the inventin.

From this, the number $n_1$ of the turns of film is derived as follows:

$$n_1 = \frac{\frac{U_{n1}}{\pi} - D_o}{2d} \tag{2}$$

wherein $D_o$ is the diameter of the cores of the spool and $d$ is the thickness of the film. These steps are shown in the flow diagram of FIG. 2. The length $L_{n1}$ of the film is calculated as follows:

$$L_{n1} = n_1 \pi [Do + (n_1 + 1) d] \quad (3)$$

and the number $n_4$ of the remaining exposures is calculated according to:

$$n_4 = \frac{L_{n1} - x1}{1} \quad (4)$$

wherein x1 is a safety lead for the film end (allowance, retightening) which cannot be fully used.

Formula (3), which is derived on the basis that the film windings are present in the form of concentric circles, can also be replaced by a derivation based upon a spiral.

The pulses from the roller b and the code disc 8 may be processed in accordance with the above relationships by any conventional device, such as calculator 11 or a computer, with the result being indicated in a conventional indicator 12, and an alarm being given by conventional alarm 13 if necessary.

We claim:

1. A method for determining a remaining supply of film on a film feed spool in an aerial photography camera, comprising
   advancing film in a film step from a film feed spool through a film advancing device to a film take-up spool;
   counting a number of first pulses representing a length of film advanced during the film step with a first coded disc connected to the film advancing device;
   counting a number of second pulses representing a length of film on a circumference of the supply of film over an angle $\alpha$ during the film step with a second coded disc connected to the film feel spool, wherein $\alpha$ is the degree of rotation of the film feed spool during the film step;
   determining a total circumference of film on the film feed spool based on the number of first pulses, the number of second pulses and the length of film advanced during the film step;
   determining a number of windings of film remaining on the film feed spool based on the total circumference and a thickness of the film; and
   determining a number of remaining exposures of film and a remaining length of film based on the number of remaining windings of film.

2. A method as in claim 1, further comprising indicating the number of remaining exposures of film and remaining length of film on an indicating unit.

3. A method as in claim 2, triggering a warning signal in the indicator unit when the remaining exposures of film or remaining length of film reaches a predetermined minimum.

4. A method as in claim 1, wherein the total circumference is determined based on the equation $$U_{n1} = \frac{360° \cdot n_3}{\alpha° \cdot n_2} \cdot 1,$$

wherein $U_{n1}$ is the total circumference, $n_2$ is the number of first pulses, $n_3$ is the number of second pulses, 1 is the length of film advanced during the film step and $\alpha°$ is the number of degrees of rotation of the film feed spool during the film step.

5. A method as in claim 4, wherein the number of windings $n_1$ is determined based on the equation $$n_1 = \frac{\frac{U_{n1}}{\pi} - Do}{2d},$$

wherein Do is the diameter of the film feed spool and d is the film thickness.

6. A method as in claim 5, wherein the remaining length of film $L_{n1}$ is determined based on the equation $$L_{n1} = n_1 \pi [Do + (n_1 + 1) d].$$

7. A method as in claim 6, wherein the number of remaining exposures of film $n_4$ is determined based on the equation $$n_4 = \frac{L_{n1} - x1}{1},$$

wherein x1 is a length of a safety lead for an end of the film.

8. A method as in claim 7, further comprising indicating the number of remaining exposures of film and remaining length of film on an indicting unit.

9. A method as in claim 8, triggering a warning signal in the indicator unit when the remaining exposures of film or remaining length of film reaches a predetermined minimum.

* * * * *